(No Model.)
J. JENKINS.
WEEDING IMPLEMENT.
No. 324,382. Patented Aug. 18, 1885.
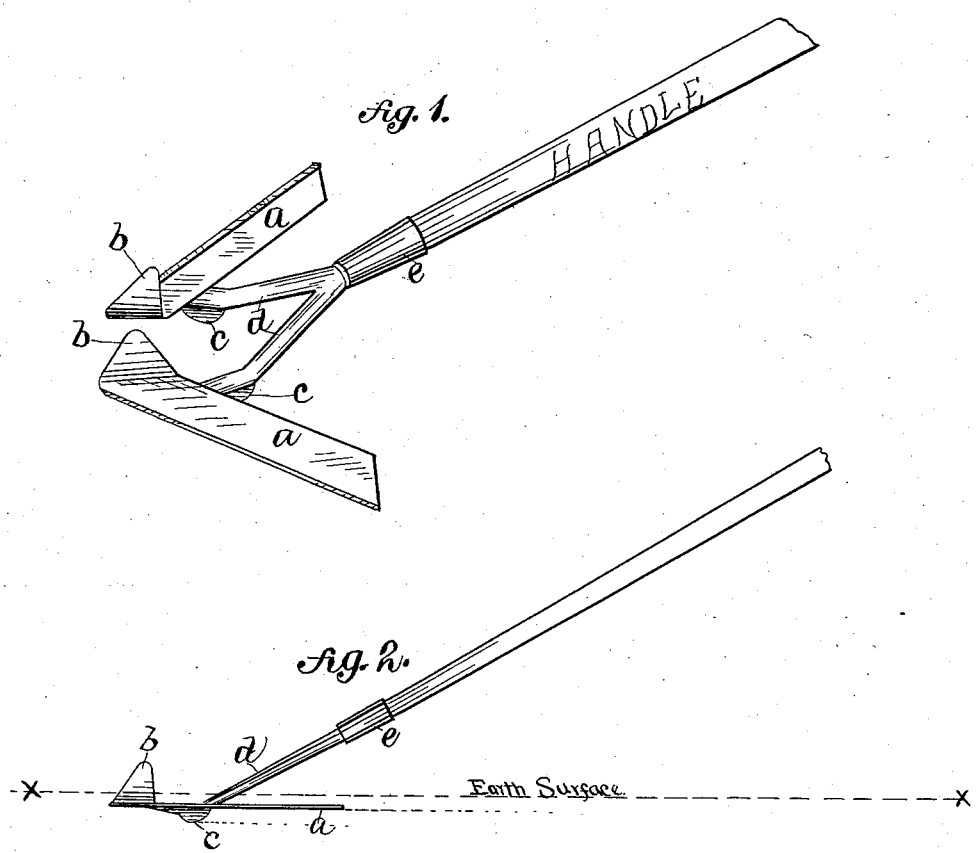

UNITED STATES PATENT OFFICE.

JOHN JENKINS, OF PILOT GROVE, INDIANA.

WEEDING IMPLEMENT.

SPECIFICATION forming part of Letters Patent No. 324,382, dated August 18, 1885.

Application filed July 21, 1884. (No model.)

*To all whom it may concern:*

Be it known that I, JOHN JENKINS, a citizen of the United States, residing at Pilot Grove, in the county of Newton and State of Indiana, have invented a new and useful Weeding Implement, of which the following is a specification, reference being had to the accompanying drawings, which form a part hereof.

My invention relates to improvements in weeding implements or hoes; and my invention consists in providing two blades to lie flat on the ground at right angles to each other, and connected together by a forked handle-shank, which is provided with thin downwardly-connecting lugs, all as hereinafter set forth.

Figure 1 is a perspective view of my invention, and Fig. 2 is a side view, as in use.

Similar letters refer to similar parts throughout the several views.

The blades $a\ a$ are made of a thin piece of steel, with the front edges sharpened and the front ends turned up, as shown at $b$. The two blades are welded or riveted to the lower ends of the forked shank $d$, as shown in Fig. 1, so that they are held firmly in their position, and secured to the handle in the ferrule $e$. The space is left between the blades so that they may be worked on each side of a plant or flower, and the ends $b$, extending above the surface, serve as a guide to allow the operator to work very close to the plants or flowers without injuring them. The lower ends of the shank $d$ are each provided with a thin lug, $c$, which extends along the under side ends, as shown, so that they cut their way through the earth in the same direction, and prevent the blades from moving sidewise when they strike the roots of weeds, &c., below the surface.

In Fig. 2 the hoe is shown as in use, the blades $a$ being seen below the surface-line $x\ x$, the lugs $c$ below the blades, and the ends $b$ above the ground, for the purpose heretofore set forth.

As thus constructed my invention is cheap, simple, and easily operated, and with it the ground may be weeded without disturbing its surface.

I am aware of what has been done by Peck, No. 131,627, September 24, 1872, (hoes,) and such I do not claim.

Having thus described my invention, I claim the following, and desire to secure the same by Letters Patent:

In a weeding-hoe, the combination of blades $a\ a$, having turned-up portions $b\ b$, with the forked shank $d$, provided with lugs $c$, as and for the purpose specified.

JOHN JENKINS.

Witnesses:
DAVID L. BISHOPP,
WORTHINGTON HENRY.